United States Patent
Port et al.

(10) Patent No.: US 10,805,723 B2
(45) Date of Patent: Oct. 13, 2020

(54) AUTOMATIC CHARACTERIZATION OF PERCEIVED TRANSDUCER DISTORTION

(71) Applicant: DOLBY LABORATORIES LICENSING CORPORATION, San Francisco, CA (US)

(72) Inventors: Timothy Alan Port, Drummoyne (AU); Sebastian P. B. Holzapfel, Mountain View, CA (US); Juan Felix Torres, Darlinghurst (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/433,933

(22) Filed: Jun. 6, 2019

(65) Prior Publication Data

US 2019/0379974 A1 Dec. 12, 2019

Related U.S. Application Data

(60) Provisional application No. 62/681,543, filed on Jun. 6, 2018.

(51) Int. Cl.
*H04R 3/04* (2006.01)
*G06F 3/16* (2006.01)
(Continued)

(52) U.S. Cl.
CPC .............. *H04R 3/04* (2013.01); *G06F 3/165* (2013.01); *G10L 21/0232* (2013.01);
(Continued)

(58) Field of Classification Search
CPC .... H04R 3/04; H04R 29/001; H04R 2499/11; H04R 1/2888; H04R 2400/13;
(Continued)

(56) References Cited

U.S. PATENT DOCUMENTS

| 5,420,516 A | 5/1995 | Cabot |
| 9,344,822 B2 | 5/2016 | Deng |

(Continued)

FOREIGN PATENT DOCUMENTS

| WO | 2008016531 | 2/2008 |
| WO | 2011115944 | 9/2011 |

(Continued)

OTHER PUBLICATIONS

Brunet, P., et. al., "Use of Repetitive Multitione Sequences to Estimate Nonlinear Response of a Loudspeaker to Music" Audio Engineering society 143rd Convention Paper 9827, dated Oct. 18-21, 2017 (9 pgs.).

(Continued)

*Primary Examiner* — Yogeshkumar Patel (57) ABSTRACT

Systems and methods for automatic characterization of perceived transducer distortion are described. The system includes a controller configured to receive a distortion level; a signal generator configured to generate a test signal for a frequency band in response to the distortion level, the test signal including at least two simultaneous tones, the at least two simultaneous tones having different frequencies within the frequency band; an audio transducer configured to generate an audio signal based on the test signal; and a distortion tuner configured to receive the audio signal and to determine the distortion level of the system based on a detected amount of distortion in the audio signal.

20 Claims, 4 Drawing Sheets

(51) Int. Cl.
*H04R 29/00* (2006.01)
*H04B 17/12* (2015.01)
*G10L 21/0232* (2013.01)

(52) U.S. Cl.
CPC .......... *H04B 17/12* (2015.01); *H04R 29/001* (2013.01); *H04R 2430/01* (2013.01)

(58) Field of Classification Search
CPC . H04R 2430/01; G10L 21/0232; H04B 17/12; G06F 3/165
See application file for complete search history.

(56) References Cited

U.S. PATENT DOCUMENTS

| | | | | |
|---|---|---|---|---|
| 10,153,744 | B1* | 12/2018 | Every | H03G 3/20 |
| 2008/0285775 | A1* | 11/2008 | Christoph | H04R 3/14 |
| | | | | 381/99 |
| 2013/0066453 | A1 | 3/2013 | Seefeldt | |
| 2013/0142360 | A1* | 6/2013 | Potard | H03G 9/18 |
| | | | | 381/98 |
| 2013/0195277 | A1 | 8/2013 | Kannan | |
| 2014/0140522 | A1* | 5/2014 | Deng | H04R 3/08 |
| | | | | 381/59 |
| 2015/0270819 | A1 | 9/2015 | Seefeldt | |

FOREIGN PATENT DOCUMENTS

| | | |
|---|---|---|
| WO | 2013009548 | 1/2013 |
| WO | 2015124598 | 8/2015 |
| WO | 2016155853 | 10/2016 |

OTHER PUBLICATIONS

Borwick, John, "Chapter 12: Loudspeaker Measurements" Loudspeaker and Headphone Handbook, Mar. 12, 2001, Focal Press, Oxford, vol. 26, pp. 529-564.

Lin, L. et al "Auditory Filter Bank Design Using Masking Curves" Proc. of Eurospeech, Sep. 3-7, 2001, pp. 411-414.

Metzler, Bob "Audio Measurement Handbook" Aug. 16, 1993, pp. 40.

* cited by examiner

AUTOMATIC CHARACTERIZATION OF PERCEIVED TRANSDUCER DISTORTION

CROSS-REFERENCE TO RELATED APPLICATIONS

This patent application claims the benefit of priority U.S. Provisional Patent Application No. 62/681,543, filed on Jun. 6, 2018, incorporated by reference in its entirety.

FIELD

This application relates generally to audio presentation and, in particular, to distortion reduction during audio presentation.

BACKGROUND

Playback devices, such as headphones, freestanding speakers, laptop computers, mobile communication devices, portable music players, and televisions; include amplifiers and audio transducers (for example, loudspeakers) with limited output capabilities. In such devices, audio playback can be perceptibly distorted as playback level is increased during presentation. Further, this distortion is oftentimes frequency dependent for a playback device. For example, a television's casing may exhibit a resonance response at a specific frequency when an output signal generally exceeds a particular level, resulting in an annoying rattle. Transducer distortion can be reduced by a multi-band compressor. The multi-band compressor attenuates particular frequency bands by applying gain values according to corresponding distortion thresholds. Identifying the gain values and distortion thresholds involves a tuning process.

SUMMARY OF THE DESCRIPTION

Various aspects of the present disclosure relate to circuits, systems, and methods for automatically characterizing perceived distortion of an audio transducer.

The present disclosure provides a system that includes, in one implementation, a controller configured to receive a distortion level; a signal generator configured to generate a test signal for a frequency band in response to the distortion level, the test signal including at least two simultaneous tones, the at least two simultaneous tones having different frequencies within the frequency band; an audio transducer configured to generate an audio signal based on the test signal; and a distortion tuner configured to receive the audio signal and to determine the distortion level of the system based on a detected amount of distortion in the audio signal. The present disclosure also provides a method that includes, in one implementation, receiving a distortion level; generating a test signal for a frequency band in response to the distortion level, the test signal including at least two simultaneous tones, the at least two simultaneous tones having different frequencies within the frequency band; adjusting an amplitude of a component of the test signal; generating an audio signal with an audio transducer based on the test signal; receiving the audio signal with a distortion tuner; determining the distortion level based on a detected amount of distortion in the audio signal.

The present disclosure also provides a non-transitory computer-readable medium storing instructions that, when executed by a processor of a computer, cause the computer to perform operations including, in one implementation, receiving a distortion level; generating a test signal for a frequency band in response to the distortion level, the test signal including at least two simultaneous tones, the at least two simultaneous tones having different frequencies within the frequency band; adjusting an amplitude of a component of the test signal; generating an audio signal with an audio transducer based on the test signal; receiving the audio signal with a distortion tuner; determining the distortion level based on a detected amount of distortion in the audio signal.

In this manner, various aspects of the present disclosure provide for the reduction of transducer distortion, and effect improvements in at least the technical fields of audio processing and presentation.

BRIEF DESCRIPTION OF DRAWINGS

The present disclosure is illustrated by way of example, and not by way of limitation, in the figures of the accompanying drawings and in which reference numerals refer to similar element and in which.

DETAILED DESCRIPTION

The inner ear of humans includes a sense organ for hearing called the cochlea, which creates an auditory filter that separates the frequency components of audio signals into a plurality of frequency bands called critical bands. In general, a critical band is a band of audio frequencies within which a second tone will interfere with the perception of the first tone by audio masking. The Bark scale is an example of a psycho-acoustical scale that ranges from 1 to 24 and corresponds to the first 24 critical bands of human hearing; however, other psycho-acoustical scales may be used which extend beyond the 24th Bark band. In one example, an extended Bark scale may be defined which includes a 25th Bark band extending above 19 kHz.

In audio transducers which reproduce sound in a wide range of frequencies, such as the range of human hearing, distortion may be present at a variety of amplitudes and frequencies. In order to reduce or eliminate the perception of such distortion, it is possible to first characterize the distortion that will be perceived by a listener. Such characterization may be performed manually or automatically. Automatic characterization of perceived transducer distortion, as described in more detail below, may be workable with devices that are too loud for manual characterization, where fatigue is an issue, or at low power. Automatic characterization may be used as an initial pass (or coarse adjustment) prior to manual characterization or to standardize adjustment across different manual (i.e., human) tuners. Furthermore, automatic characterization provides a set of measurements of speakers over time, rather than solely instantaneously.

Figure 1:
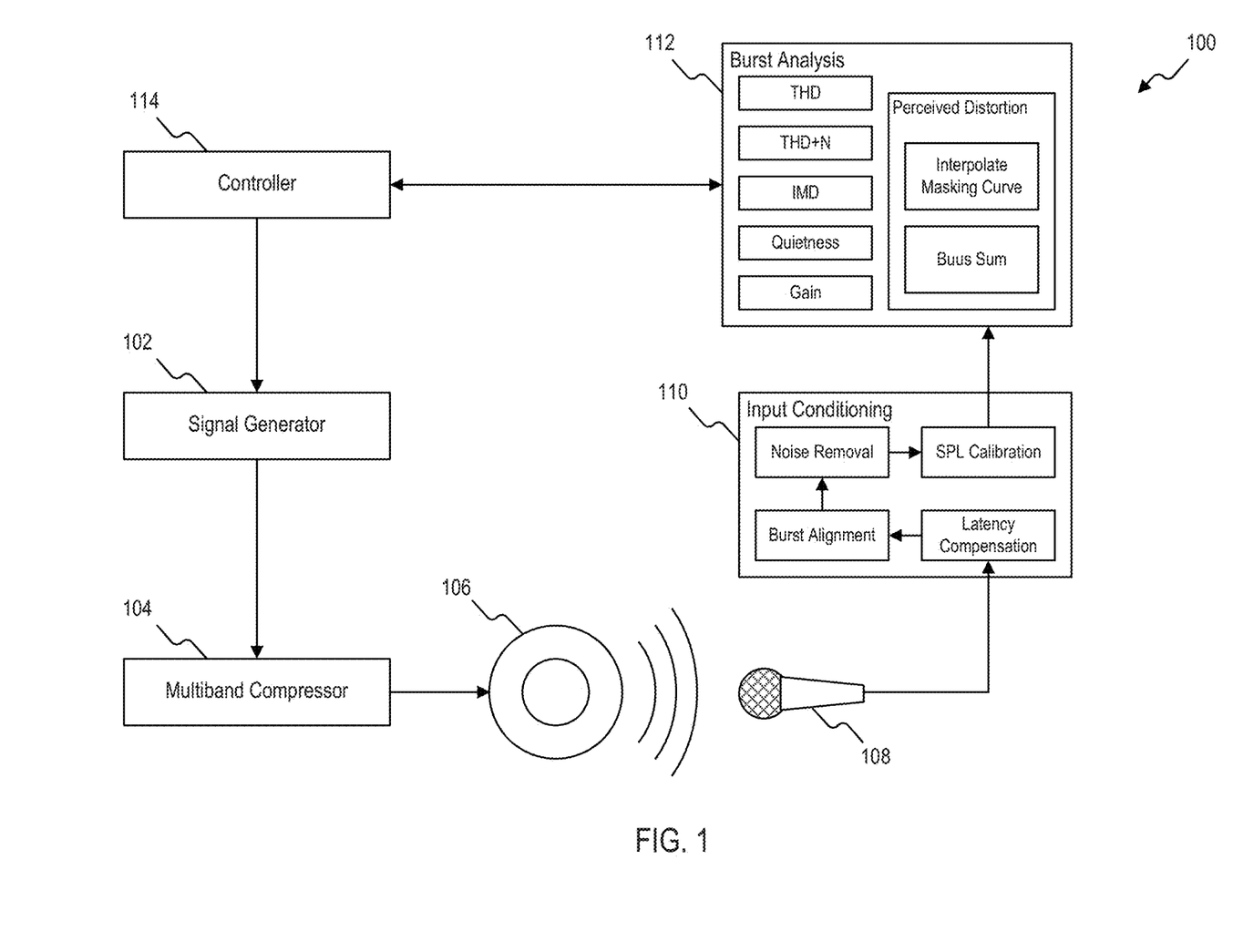
FIG. 1 illustrates a block diagram of an exemplary system for automatic characterization of perceived transducer distortion, according to an implementation of the present disclosure.

FIG. 1 illustrates a block diagram of an example system for automatic characterization of perceived transducer distortion according to an implementation of the present disclosure. Specifically, FIG. 1 illustrates a system 100 which includes a signal generator 102, a multi-band gain which may be implemented in the form of a multi-band compressor 104, an audio transducer 106, an audio recorder 108, an input conditioning unit 110 (e.g., an input conditioning circuit, a non-transitory computer-readable medium including an input conditioning module, or combinations thereof), a burst analysis unit 112 (e.g., a burst analysis circuit, a non-transitory computer-readable medium including a burst analysis module, or combinations thereof), and a controller 114. The audio recorder 108, the input conditioning unit 110, and the burst analysis unit 112 may collectively be referred to as a "distortion tuner." In practice, the system 100 may include additional components such as additional audio transducers, additional signal processors (for example, amplifiers), a power supply, a memory, and the like. For ease of explanation, these additional components are not illustrated here.

While FIG. 1 illustrates the multi-band gain implemented as a multi-band compressor directly coupled to the system, the present disclosure is not so limited. In some implementations, the multi-band compressor 104 may be replaced by applying a gain to the input signal. In such a case, when distortion is detected (as will be described in more detail below), the gain that is applied to the input signal may then be mapped to a multi-band gain.

The signal generator 102 is configured to generate test signals for the audio transducer 106. To minimize heating within the audio transducer 106, the test signals preferably have a low duty cycle. As will described below in more detail, the multi-band compressor 104 adjusts the test signals by splitting them into different frequency bands, and then individually adjusting the components of each frequency band in order to reduce or eliminate perceived distortion.

In some implementations, the different bands of the multi-band compressor 104 are divided among the range of human hearing. For example, each frequency band of the multi-band compressor 104 may represent one of the critical bands of the Bark scale described above. As will be described below in more detail, each test signal is designed to test a specific frequency band of the different frequency bands of the multi-band compressor 104. For example, the signal generator 102 may generate a test signal to test one of the critical bands of the Bark scale described above. In some aspects of the present disclosure, a frequency band may correspond to the entire spectrum.

The signal generator 102 is configured to include two or more simultaneous tones in each test signal. The frequency of each tone included in a test signal is different. As described above, each test signal is designed to test a specific frequency band (or set of bands) of the multi-band compressor 104. Thus, the frequency of each tone included in a test signal is within the frequency band being tested by the test signal. For example, a test signal for a first frequency band may include a first tone with a frequency that is within the first frequency band, and a second tone with a different frequency that is also within the first frequency band. The tones are not necessarily limited to pure tones, and may include one or more frequency-modulated tones ("warble" tones). As such, the test signal is a signal that includes at least two concurrent frequencies.

In some implementations, the tones for a test signal are selected to be at least a predetermined amount away from each other within a frequency band. For example, a test signal for a frequency band may include two tones with a frequency difference of at least ten percent of the bandwidth of the frequency band. Alternatively or in addition, the tones for a test signal are selected to be on opposite sides of the center frequency of the frequency band. For example, a test signal for a frequency band may include a first tone below the center frequency of the frequency band and a second tone above the center frequency of the frequency band. In some implementations, the tones for a test signal are selected to extend a predetermined amount on either side of the center frequency of the frequency band. For example, a test signal for a frequency band may include a first tone that extends below the center frequency of the frequency band by five percent of the bandwidth of the frequency band and a second tone that extends above the center frequency of the frequency band by five percent of the bandwidth of the frequency band.

Figure 2:
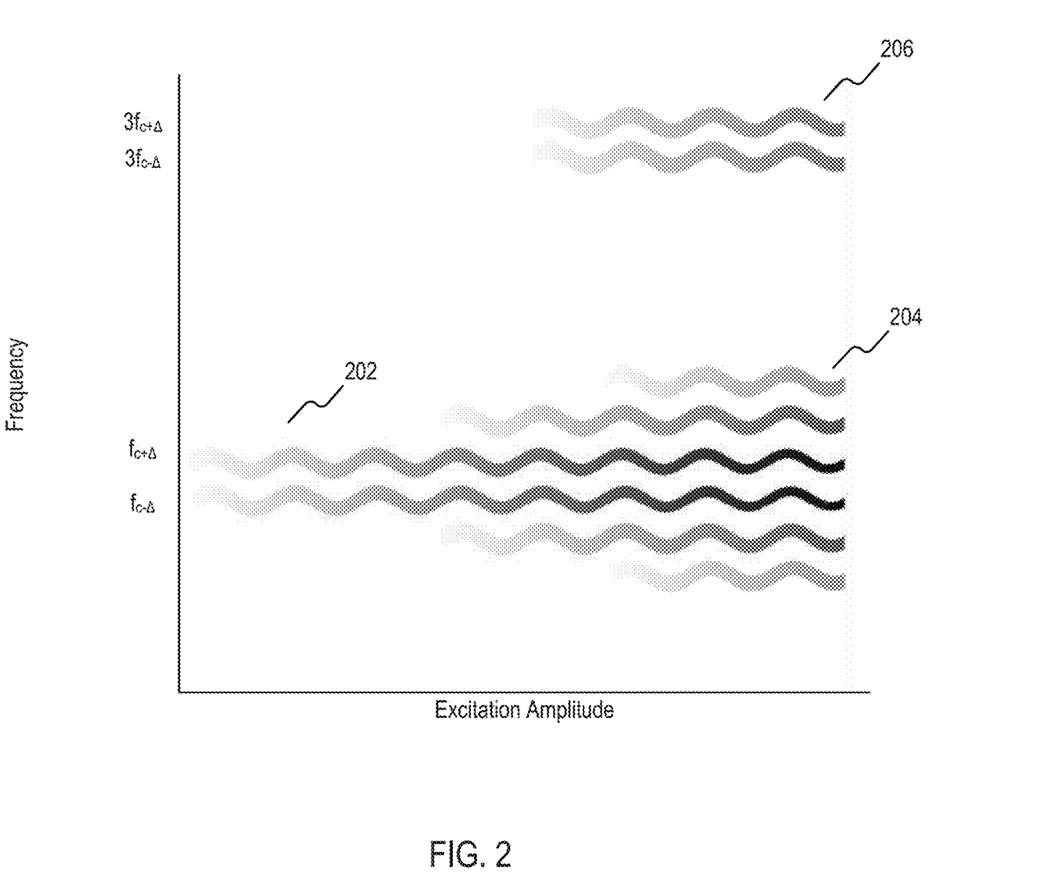
FIG. 2 illustrates a waveform of an exemplary relationship between system behavior and excitation amplitude, according to an implementation of the present disclosure.

When reproduced in an audio system, a single sine tone (a "pure" tone) exhibits harmonic distortion due to, among other things, nonlinearities in the audio system. Harmonic distortion, however, is inaudible when the fundamental frequency is greater than half the upper frequency threshold of the listener (which varies from listener to listener); for example, above 12 kilohertz. Thus, pure tones are unsuitable for characterizing perceived transducer distortion at fundamental frequencies over a particular limit. While the following description uses 12 kilohertz as the particular limit for explanatory purposes, the present disclosure is not so limited. On the other hand, in addition to producing harmonic distortion, multiple simultaneous tones also produce intermodulation distortion (IMD). IMD is the amplitude modulation of signals containing two or more different frequencies, caused, for example, by nonlinearities in an audio system. The intermodulation between frequency components forms additional distortion components at frequencies that are not just at harmonic frequencies of either frequency component, and is thus different from the case of harmonic distortion. FIG. 2 illustrates an example of the relationship between the system behavior and excitation amplitude. As illustrated in FIG. 2, at low excitation two tones 202, which may be the tones generated by the signal generator 102, are present. As the excitation amplitude increases, subharmonic intermodulation products 204 may be introduced. Once the excitation amplitude exceeds a particular threshold, harmonic distortion products 206 may become present and noticeable. The particular type of products introduced as the excitation amplitude increases (whether subharmonic intermodulation products 204, harmonic distortion products 206, or both) is system-dependent. In some systems, the harmonic distortion products 206 may be measurable before the subharmonic intermodulation products 204. Generally, intermodulation forms additional components at the sum and difference frequencies of the original frequencies and at sums and differences of multiples of those frequencies. For example, intermodulation between different frequencies above 12 kilohertz can create distortion (i.e., IMD) at frequencies below 12 kilohertz. In other words, a test signal including two tones above 12 kilohertz will generate audible distortion. Thus, the test signals generated by the signal generator 102 allow characterization of perceived transducer distortion at fundamental frequencies above 12 kilohertz.

The system 100 may further include linear filter protection, such as a notch filter, disposed in series with (e.g., preceding) the multi-band compressor 104. Such protection may ensure that the multi-band compressor 104 can operate without limiting or compressing the signal around a resonant peak of a speaker or of the system as a whole. The amplitude (i.e., volume level) of the audio signal (also referred to as "bursts" or "burst excitations") generated by the audio transducer 106 follows the amplitude of the test signal. As will be described in more detail below, the amplitude of each tone included in the test signal is the same for a given audio signal, and the amplitude is ramped in predetermined steps (e.g., three decibels) from a minimum amplitude to a maximum amplitude to thereby provide a number of different audio signals. The number and/or size of the steps may itself be controlled by an operator. In some examples, the system 100 may be provided with a slider or other input device to allow the operator to adjust various parameters and thereby control the amplitude sequence. Additionally or alternatively, the operator or controlling algorithm may adjust the frequencies of respective tones included in the test signal, the range of the frequency behavior to test, or combinations thereof. In some implementations, the tuning operations may be performed multiple times in succession; for example, the tuning may be performed once without filter protection to characterize the entire system, and may be performed a subsequent time or times with the filter protection.

Returning to the particular example illustrated in FIG. 1, the multi-band compressor 104 is coupled to the signal generator 102 and is configured to receive the test signal therefrom. The multi-band compressor 104 is configured to apply differing gain values to each frequency band. As described above, each test signal includes components for one frequency band. Thus, the multi-band compressor 104 is configured to adjust an amplitude of the test signal by applying a gain value corresponding to the frequency band of the components included in the test signal. By applying the gain value, the multi-band compressor 104 effectively limits the peak amplitude of the test signal to a threshold value. In implementations where the multi-band compressor 104 is not present, the differing gain values may be applied (e.g., mapped) to the input of the signal generator 102.

The audio transducer 106 (for example, a loudspeaker) is coupled to the multi-band compressor 104 and receives the test signal therefrom. The audio transducer 106 is configured to generate an audio signal based on the test signal. In some implementations, the audio signal is within the audible frequency range for humans. In general, the audible frequency range for humans is from 20 hertz to 20,000 hertz. The audio signal may further include periods of silence appended before and after the test signal, which may be proportional to a latency of the on-board sound card and thereby ensure that the entirety of the test signal is captured.

The system 100 further includes an audio recorder 108, such as one or a plurality of microphones. The audio recorder 108 is placed at a predetermined position relative to the audio transducer 106. The audio recorder 108 receives the audio signal plus any ambient or background audio and outputs an electrical signal to the input conditioning unit 110. The input conditioning unit performs various operations, including latency compensation, burst alignment, noise removal, sound pressure level (SPL) calibration, or combinations thereof. While FIG. 1 illustrates each of the above operations being performed in a particular order, this is exemplary and not limiting. In some implementations, some of the operations may be omitted or may be performed in a different order than illustrated in FIG. 1.

Where a latency compensation operation is performed, it may include the removal of any periods of silence that have been appended before and after the test signal, as described above. Where a burst alignment operation is performed, it may include steps such as finding the center of the burst, determining an analysis window about the center of the burst, and performing a Fast Fourier Transform (FFT). In one example, the center of the burst may be determined by filtering out everything except the fundamentals with a filter, such as a third-order Butterworth bandpass filter; applying an initial window such as a Tukey window to eliminate filtering artifacts at the start of the response; and setting the index of the highest amplitude within the filtered and initially-windowed response as the center of the burst. Furthermore, the analysis window may be determined by applying a window such as Blackman-Harris window to the center of the burst. The window is preferably of a size large enough to discern between closely-spaced frequencies but small enough to prevent low amplitudes in the burst from entering the window and skewing the measurement. Most preferably, the window size is set to analyze the middle 50% of the burst. The particular type of window is exemplary and not limiting. Subsequently, an FFT may be performed on the windowed burst and used to calculate frequency indices.

Where a noise removal operation is performed, it may include the creation of a magnitude spectrum of the background noise (e.g., HVAC systems) that matches the burst analysis scaling. To facilitate a determination of the background noise, the system 100 may monitor background noise for a period of time to thereby generate raw background audio data. The raw background audio data may then be split into a number of windows. The window size and/or windowing method may be the same as the windows used in the above-described burst alignment operation. As such, the window size is longer at lower frequencies. Subsequently, an FFT is performed on each window and the following calculations may be performed in the linear domain: a calculation of the average magnitude over the set of windows per bin; a calculation of the variance of the magnitudes per bin; a calculation of an overestimate, representing the average plus a number of standard deviations from the mean; a calculation of the maximum ratio between the powers of the overestimate, which corresponds to a correction factor or offset. Thereafter, the noise-corrected power response may be obtained by subtracting the correction factor times the noise response from the uncorrected power response. In some implementations, the correction factor is a predetermined offset of six decibels. Such an amount will generally be sufficient to account for the occurrence of instantaneous noise above the noise floor estimate which could cause false cutouts.

The SPL calibration operation may be utilized to convert the digital signal level (e.g., from the audio recorder 108) to an SPL value. Where the SPL calibration operation is performed, it may include correcting the windowed burst that has been subject to an 1-1-T so as to correct for the window response; scaling the corrected response so that it is SPL-calibrated; and creating a response map from the scaled corrected response.

After the input has been appropriately conditioned by performing one or more of the above operations in the input conditioning unit 110, the burst analysis unit 112 performs a variety of analyses. Some of the analyses may include the calculation of various parameters, and the burst analysis unit 112 is provided with a plurality of sub-circuits and/or subroutines to perform the requisite calculations. These may include determining the amplitude of fundamentals as a result of the excitation, which may also include finding the equivalent noise power and difference (in decibels) between the response tone and noise. The calculations may additionally or alternatively include computing the total harmonic distortion (THD), which may be calculated based on the sum of the second harmonic up to a predetermined threshold such as the eighth harmonic. THD may be utilized to detect hard clipping of an amplifier or speaker. The calculations may additionally or alternatively include computing the total harmonic distortion plus noise (THD+N), which may be calculated by comparing the RMS sum of the whole frequency domain response vs the same response with DC and the fundamentals filtered out. Background noise may be subtracted from both of these results. THD+N may be utilized to detect case rattle and other noise, as compared with THD. The calculations may additionally or alternatively include computing the IMD, which may be calculated in a similar manner to THD but based on the sum of intermodulation products (e.g. at $2\times(f_1-f_2)$, $2\times(f_2-f_1)$, etc.) instead of the sum of harmonics. IMD may be utilized at all frequencies, and especially at high frequencies, to indicate that the speaker is being driven an excessive amount.

In some implementations, some or all of the calculations are performed on the noise-corrected versions of the input signal; that is, the original signal magnitude minus the noise floor estimate (represented as a power or magnitude). In such an implementation, the metrics used in performing any of the above calculations may be selected based on the fundamental signal-to-noise ratio (SNR), the IMD SNR, and/or the average spectrum SNR. Specifically, one or more of the fundamental SNR, the IMD SNR, and the average spectrum SNR may be used to determine whether one or more of THD, THD+N, or IMD are appropriate for use in the calculations.

Based on one or more of the above analyses, the burst analysis unit 112 may determine a distortion level for the system 100. The burst analysis unit 112 may also determine the distortion level based on whether any distortion present in the system 100 is perceptible; that is, whether a human listener would be able to hear the distortion that the speaker is producing. The determination of perceived distortion may include the creation of a masking curve D at the excitation frequencies, the creation of a perceptible curve M, the determination of a distortion/masking (D/M) ratio, the use of the D/M ratio in the linear domain to compute a sensation level, and/or the use of a Buus combination model to combine the sensation levels into a final distortion audibility number. In determining the respective curves, the noise-corrected versions of the corresponding signals are used.

In determining the sensation level, the D/M ratio may be designated as a respective audibility component for each frequency band and the audibility components may be converted into Equivalent Rectangular Bandwidth (ERB) bands. The sensation level is used not only to determine the audibility of harmonic distortion products, but also the audibility of IMD products and/or any other non-linear products. The ERB bands are defined to include the entire spectrum, minus the fundamentals Once the ERB bands have been defined, the audibility components are combined into an individual audibility number for each ERB band by, for example, RMS summation of the audibility components over each band. The resultant value is designated as the sensation level, and represents the number of decibels relative to the audibility threshold for each ERB band in isolation.

The Buus combination model refers to a calculation model used for performing correction when multiple ERB bands are concurrently stimulated, as a human listener is more likely to find such a situation audible compared to a situation in which only a single ERB band is stimulated. Under the Buus combination model, the distortion audibility metric may be based on an appropriately-scaled log-sum-exp (LSE) calculation performed in base 10, wherein the exponent within the sum is based on the sensation level and the summation is performed over ERB bands.

In one implementation, the masking curve D may be determined from the pure tones by interpolation. In this implementation, an amplitude amount is subtracted from the measured amplitude in the log domain to create a masking curve, thereby to correct for the distance between the speaker and the listener's ear. The masking curve is then converted to the linear domain. The amplitude amount is dependent on the product category, and may be based on an expected speaker-listener distance from, e.g., 10-50 centimeters in products such as laptop computers to approximately 1.5 meters or more in products such as televisions. In calculating the amplitude amount, the distance between the speaker and the microphone (e.g., between the audio transducer 106 and the audio recorder 108 illustrated in FIG. 1) is also used, and may be measured using a ruler. In one example, the predetermined amplitude amount is 18 decibels. The two masking curves are then added to create a combined masking curve. In other implementations, multitone warbles may be used instead of pure tones.

The masking curve may be an amplitude curve created at each frequency. In such an implementation, the masking curve creation depends on the number of curves present for interpolation. Where there are two curves to interpolate between (e.g., one above and one below a target amplitude), the masking curve may be determined by linearly interpolating between the two. Where there is only one curve (e.g., only one above or only one below a target amplitude), everything except the hearing threshold is shifted up or down accordingly, taking the maximum of this change and the hearing threshold. If the amplitude is an exact or nearly-exact match, there is no need to create a masking curve and the amplitude curve may be used as-is.

Given the set of amplitude interpolations above, the burst analysis unit 112 may generate a curve for a target frequency. As above, the masking curve creation depends on the number of curves present for interpolation. Where there are two curves to interpolate between, both source curves may be merged into a target curve. That is, both source curves may initially be modified so that everything near the hearing threshold is zeroed out. Subsequently, both curves are linearly resampled such that they are repositioned where the target frequency curve is expected to be. Thereafter, the resampled curves are linearly interpolated between with a ratio proportional to their distance from the target frequency. Finally, the maximum of the hearing threshold and the linearly interpolated curve is taken. Where there is only one curve, the curve is shifted using a linear extrapolation at the low end as the curve moves upward in frequency. If the curves are an exact or nearly-exact map, there may be no need to create a masking curve and the frequency curve may be used as-is. Depending on the underlying data, interpolation other than linear interpolation may be implemented in order to maintain the relationship between the fundamental and the local maxima of the masking curve.

Based on the above analyses and in combination with one or more metrics, the burst analysis unit 112 may determine whether the distortion level is excessive. First, the burst analysis unit 112 may compute a confidence factor which represents how far the response is above a noise level. This is computed based on how far the fundamental and first harmonics are above the noise level. The confidence factor may be represented as a number between zero and one, where one represents that the fundamental plus harmonics are greater than a predetermined threshold, such as 80 decibels. The confidence factor may be used with parameters such as THD, THD+N, and/or IMD to improve sensitivity; however, the confidence factor may not be necessary when using perceived distortion. Then, the burst analysis unit 112 may check for one or more failure conditions. In other words, the burst analysis unit 112 determines whether any of the requisite metrics are above a threshold. The threshold may be device-specific and/or metric-specific. For example, when using a perceived distortion metric a value of 20 decibels may be sufficient for large speakers but may be overly conservative for comparatively small speakers. When using an IMD metric, the threshold may be selected to avoid overdriving the speaker or to prevent hard clips. When using a THD or THD+N metric, the threshold may be set to be a predetermined percentage above the perceived distortion metric threshold. Where a predetermined offset is selected to overestimate the noise floor, as described above, the determination may be based on the fundamental SNR, the IMD SNR, and/or the average spectrum SNR as described above.

The burst analysis unit 112 may also check for a "quietness failure" condition. A quietness failure may occur where a speaker is unable to reproduce a particular frequency band. The quietness failure check may be based on a difference between the current excitation and the noise level. If the difference is less than 10 decibels, for example, and another excitation has previously been seen above 75 decibels SPL, the quietness check may indicate a failure and it is thus assumed that the speaker cannot reproduce sound in this band. The quietness failure check may prevent a system from overexciting a speaker at a frequency for which it is not designed, and thereby prevent the speaker from overheating.

As a result, the burst analysis unit 112 outputs a corrective gain value. The corrective gain value is output to the controller 114, which is operatively connected to and controls the signal generator 102. Thus, if a gain value indicated by the burst analysis unit 112 differs from the current gain value applied by the multi-band compressor 104, the gain value of the multi-band compressor 104 is adjusted to match the gain value indicated by the burst analysis unit 112. For example, if a gain value of the multi-band compressor 104 is five decibels and the controller 114 receives an input indicating a gain value of three decibels, the gain value of the multi-band compressor 104 is adjusted from five decibels to three decibels. In some implementations, the corrective gain value indicates a gain value for a specific frequency band of the multi-band compressor 104.

The above-described automatic tuning may be performed during an initial calibration at the time of manufacture or may be performed on a sampling of units prior to manufacture. In some implementations, the automatic tuning may be supplemented by manual tuning performed by an end-user of the audio device (e.g., a home consumer). In such cases, the automatic tuning may provide for coarse-grain tuning and the manual tuning may provide for fine-grain tuning.

Figure 3:
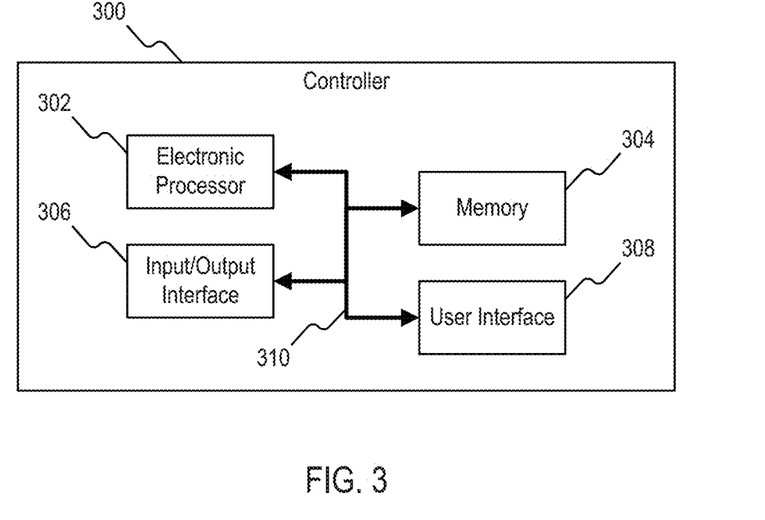
FIG. 3 illustrates a block diagram of an exemplary controller, according to an implementation of the present disclosure.

FIG. 3 is a block diagram of example components of a controller 300 according to an implementation of the present disclosure, which may be, for example, the controller 114 illustrated in FIG. 1. In the implementation illustrated in FIG. 3, the controller 300 includes an electronic processor 302 (for example, one or more microprocessors, ASICs, SoCs, or other electronic controllers), memory 304, an input/output interface 306, a user interface 308, and a bus 310. In practice, the controller 300 may include additional components such as communication circuitry, sensors, a power supply, and the like. For ease of explanation, these additional components are not illustrated here.

The bus 310 connects various components of the controller 300 including, for example, the memory 304 to the electronic processor 302. The memory 304, for example, includes read only memory (ROM), random access memory (RAM), an electrically erasable programmable read-only memory (EEPROM), other non-transitory computer-readable media, or a combination thereof. The electronic processor 302 is configured to retrieve program instructions and data from the memory 304 and execute, among other things, instructions to perform the methods described herein. In some implementations, the memory 304 is included in the electronic processor 302.

The input/output interface 306 includes routines for transferring information between components within the controller 300 and other components of the system 100, as well as components external to the system 100. The input/output interface 306 is configured to transmit and receive signals via wires, fiber, wirelessly, or a combination thereof. Signals may include, for example, gain values, distortion thresholds, information, data, serial data, data packets, analog signals, or a combination thereof.

The user interface 308 includes, for example, a computer having a display and input devices, a touch-screen display, a plurality of knobs, dials, switches, buttons, faders, and the like. In some implementations, the user interface 308 includes a touch-sensitive interface (e.g., a touch-screen display) that displays visual output generated by software applications executed by the electronic processor 302. Visual output includes, for example, graphical indicators, lights, colors, text, images, graphical user interfaces (GUIs), combinations of the foregoing, and the like. The touch-sensitive interface also receives user input using detected physical contact (e.g., detected capacitance or resistance). In some implementations, the user interface 308 is separated from the controller 300 or from the system 100.

For illustration purposes, FIG. 1 illustrates various components of the system 100 as generally self-contained or interconnected in a particular manner; however, the present disclosure is not so limited. In some aspects of the present disclosure, some or all of the audio recorder 108, the input conditioning unit 110, and the burst analysis unit 112 may be provided in a single device. Various interconnections between different units and devices may be wired, wireless, or a combination of wired and wireless. For example, the audio recorder 108, the input conditioning unit 110, and the burst analysis unit 112 may communicate with one another via wires, while the burst analysis unit 112 and the controller 114 communicate with one another wirelessly.

Figure 4:
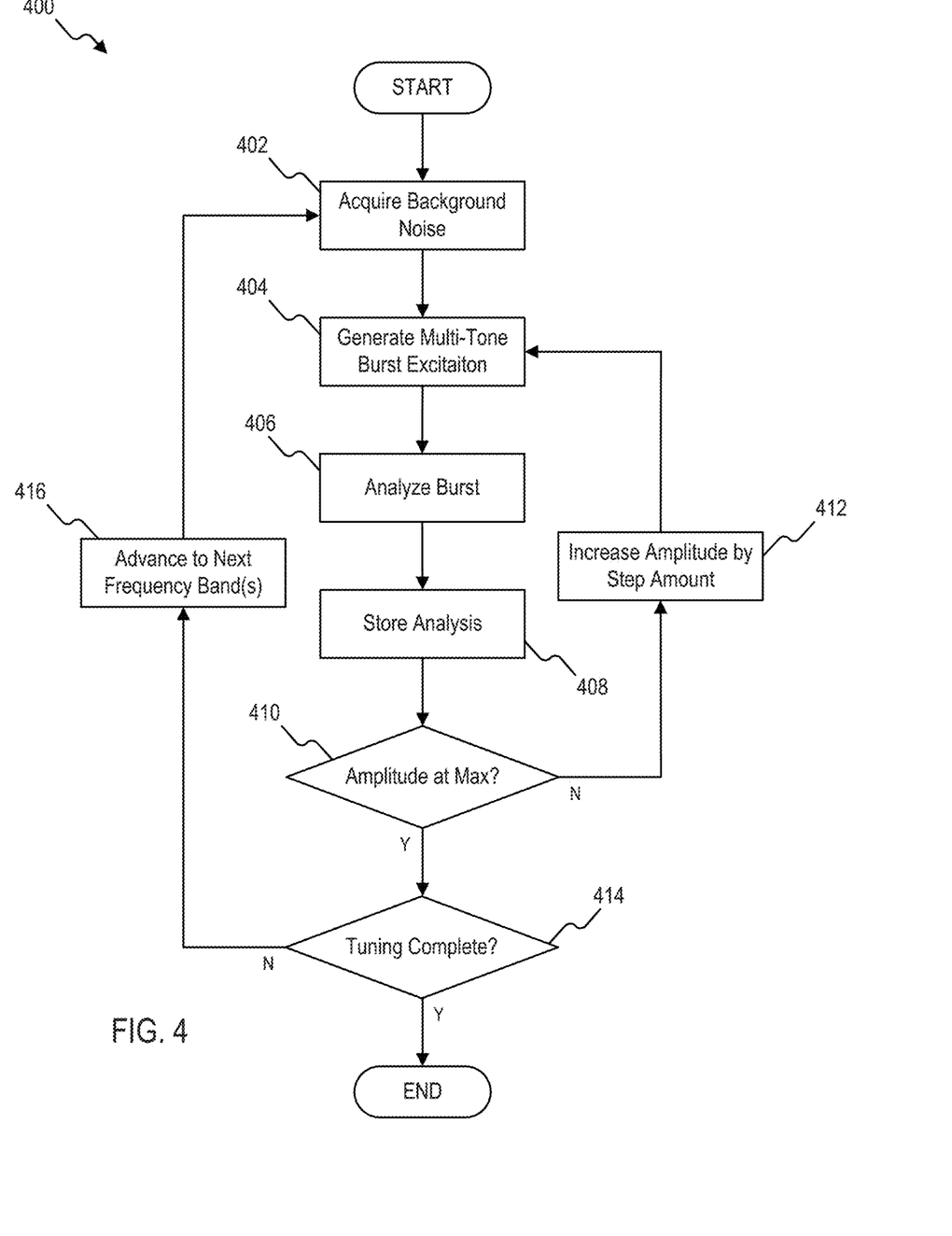
FIG. 4 illustrates a flow diagram of an exemplary method for automatic characterization of perceived transducer distortion, according to an implementation of the present disclosure.

FIG. 4 illustrates a flow diagram of an example method 400 for automatic characterization of perceived transducer distortion according to an implementation of the present disclosure. For ease of description, the method 400 is described below as being performed by the system 100 illustrated in FIG. 1. At block 402, background noise is acquired (e.g., by the audio recorder 108). The background noise may correspond to a particular frequency band or bands, and may be stored at block 402 or before changing from one band to another. At block 404, a multi-tone burst excitation is generated. For example, the signal generator 102, multi-band compressor 104, and the audio transducer 106 may generate two or more simultaneous tones combined into a test signal at a predetermined amplitude, the two or more simultaneous tones having different frequencies within a particular frequency band. In some implementations, the method 400 may be performed on multiple frequency bands simultaneously; e.g., to provide increased speed. The burst excitation may be recorded by the audio recorder 108. At block 406, the recorded bursts are analyzed (e.g., by the input conditioning unit 110 and/or the burst analysis unit 112). The analysis may proceed as described above with regard to FIGS. 1-2; for example, using one or more of the distortion metrics described above. The results of the analysis are stored at block 408. The results may be stored in a memory associated with the burst analysis unit 112 and/or the controller 114. The analysis is performed using data at multiple amplitudes so that, for example, a quietness failure check may be performed. Thus, at block 410, it is determined if the amplitude meets a predetermined limit. If the amplitude is below the predetermined limit, the amplitude is increased (e.g., by the multi-band compressor 104) by a step amount at block 412 and the method 400 returns to block 404, where a new multi-tone burst excitation is generated at the adjusted amplitude. This cycle repeats until the amplitude is at a maximum value, at which point the method 400 moves to block 414.

At block 414, it is determined whether the tuning is complete. For example, it may be determined if all frequency bands have been analyzed. If tuning is not complete, at block 416 the system may advance to the next frequency band and return to block 402 to acquire additional background noise data pertaining to the new band. In some implementations, the background noise acquisition may be performed only a single time for the entire frequency spectrum; in this case, the method 400 may proceed from block 416 to the loop provided by blocks 404, 406, 408, 410, and 412. Once tuning is complete, the results may be stored in the form of a tuning signal which may include a set of points or tone curve that represent a gain value as a function of a tone frequency and/or amplitude.

Implementation Mechanisms—Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. The techniques are not limited to any specific combination of hardware circuitry and software, nor to any particular source for the instructions executed by a computing device or data processing system.

The term "storage media" as used herein refers to any media that store data and/or instructions that cause a machine to operation in a specific fashion. It is non-transitory. Such storage media may comprise non-volatile media and/or volatile media. Non-volatile media includes, for example, optical or magnetic disks. Volatile media includes dynamic memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

The term "audio transducer" as used herein can include, without limitation, a loudspeaker (for example, a direct radiating electro-dynamic driver mounted in an enclosure), a horn loudspeaker, a piezoelectric speaker, a magnetostrictive speaker, an electrostatic loudspeaker, ribbon and planar magnetic loudspeaker, a bending wave loudspeaker, a flat panel loudspeaker, a distributed mode loudspeaker, a Heil air motion transducer, a plasma arc speaker, a digital speaker, and any combination/mix thereof.

EQUIVALENTS, EXTENSIONS,
ALTERNATIVES, AND MISCELLANEOUS

In the foregoing specification, possible implementations of the present disclosure have been described with reference to numerous specific details that may vary from implementation to implementation. Any definitions expressly set forth herein for terms contained in the claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is."

Additionally, in the foregoing description, numerous specific details are set forth such as examples of specific components, devices, methods, etc., in order to provide a thorough understanding of implementations of the present disclosure. It will be apparent, however, to one skilled in the art that these specific details need not be employed to practice implementations of the present disclosure. In other instances, well-known materials or methods have not been described in detail in order to avoid unnecessarily obscuring implementations of the present disclosure.

Various aspects of the present disclosure may take any one or more of the following exemplary configurations:

EEE(1) A system, comprising: a controller configured to receive a distortion level; a signal generator configured to generate a test signal for a frequency band in response to the distortion level, the test signal including at least two simultaneous tones, the at least two simultaneous tones having different frequencies within the frequency band; an audio transducer configured to generate an audio signal based on the test signal; and a distortion tuner configured to receive the audio signal and to determine the distortion level of the system based on a detected amount of distortion in the audio signal.

EEE(2) The system according to EEE(1), wherein the signal generator is configured to adjust an amplitude of a component of the test signal in steps of a predetermined amount.

EEE(3) The system according to EEE(1) or EEE(2), wherein respective ones of the at least two simultaneous tones are pure sine tones.

EEE(4) The system according to any one of EEE(1) to EEE(3), wherein the distortion tuner is configured to determine the distortion level of the system based on a total harmonic distortion of the audio signal, a background noise, a system noise, an intermodulation distortion of the audio signal, or combinations thereof.

EEE(5) The system according to any one of EEE(1) to EEE(4), wherein the distortion tuner is configured to generate the distortion level based on a perceptibility of the distortion.

EEE(6) The system according to any one of EEE(1) to EEE(5), further comprising a multi-band compressor coupled to the signal generator and configured to adjust an amplitude of a component of the test signal.

EEE(7) The system according to EEE(6), wherein the multi-band compressor is configured to adjust the amplitude of the component of the test signal in steps of a predetermined amount.

EEE(8) A method, comprising: receiving a distortion level; generating a test signal for a frequency band in response to the distortion level, the test signal including at least two simultaneous tones, the at least two simultaneous tones having different frequencies within the frequency band; adjusting an amplitude of a component of the test signal; generating an audio signal with an audio transducer based on the test signal; receiving the audio signal with a distortion tuner; determining the distortion level based on a detected amount of distortion in the audio signal.

EEE(9) The method according to EEE(8), wherein the adjusting the amplitude of the component of the test signal is performed in steps of a predetermined amount.

EEE(10) The method according to EEE(8) or EEE(9), wherein respective ones of the at least two simultaneous tones are pure sine tones.

EEE(11) The method according to any one of EEE(8) to EEE(10), wherein respective ones of the at least two simultaneous tones are frequency-modulated tones.

EEE(12) The method according to any one of EEE(8) to EEE(11), wherein the determining the distortion level is based on a total harmonic distortion of the audio signal, a background noise, a system noise, an intermodulation distortion of the audio signal, or combinations thereof.

EEE(13) The method according to any one of EEE(8) to EEE(12), wherein generating the distortion level is based on a perceptibility of the distortion.

EEE(14) The method according to any one of EEE(8) to EEE(13), wherein the distortion level is based on masking curve that represents an amplitude value as a function of a frequency.

EEE(15) The method according to any one of EEE(8) to EEE(14), wherein the distortion level is based on an interpolation between two masking curves, wherein the masking curves respectively represent an amplitude value as a function of a frequency.

EEE(16) A non-transitory computer-readable medium storing instructions that, when executed by an electronic processor of a computer, cause the computer to perform operations comprising: receiving a distortion level; generating a test signal for a frequency band in response to the distortion level, the test signal including at least two simultaneous tones, the at least two simultaneous tones having different frequencies within the frequency band; adjusting an amplitude of a component of the test signal; generating an audio signal with an audio transducer based on the test signal; receiving the audio signal with a distortion tuner; determining the distortion level based on a detected amount of distortion in the audio signal.

EEE(17) The non-transitory computer-readable medium according to EEE(16), wherein the adjusting the amplitude of the component of the test signal is performed in steps of a predetermined amount.

EEE(18) The non-transitory computer-readable medium according to EEE(16) or EEE(17), wherein the determining the distortion level is based on a total harmonic distortion of the audio signal, a background noise, a system noise, an intermodulation distortion of the audio signal, or combinations thereof.

EEE(19) The non-transitory computer-readable medium according to any one of EEE(16) to EEE(18), wherein generating the distortion level is based on a perceptibility of the distortion.

EEE(20) The non-transitory computer-readable medium according to any one of EEE(17) to EEE(19), wherein respective ones of the at least two simultaneous tones are pure sine tones or frequency-modulated tones.

What is claimed is:

1. A system, comprising:
a controller configured to divide a frequency range into a plurality of frequency bands and, automatically for each of the plurality of frequency bands, to receive a distortion level;
a signal generator configured to, automatically for each of the plurality of frequency bands, generate a test signal for the frequency band in response to the distortion level, the test signal including at least two simultaneous tones, the at least two simultaneous tones respectively being pure sine tones or frequency-modulated tones and having different concurrent frequencies within the frequency band;
an audio transducer configured to, automatically for each of the plurality of frequency bands, generate an audio signal based on the test signal; and
a distortion tuner configured to, automatically for each of the plurality of frequency bands, receive the audio signal and to determine the distortion level of the system based on a detected amount of distortion in the audio signal.

2. The system according to claim 1, wherein the signal generator is configured to adjust an amplitude of a component of the test signal in steps of a predetermined amount.

3. The system according to claim 1, wherein respective ones of the at least two simultaneous tones are pure sine tones.

4. The system according to claim 1, wherein the distortion tuner is configured to determine the distortion level of the system based on a total harmonic distortion of the audio signal, a background noise, a system noise, an intermodulation distortion of the audio signal, or combinations thereof.

5. The system according to claim 1, wherein the distortion tuner is configured to generate the distortion level based on a perceptibility of the distortion.

6. The system according to claim 1, further comprising a multi-band compressor coupled to the signal generator and configured to adjust an amplitude of a component of the test signal.

7. The system according to claim 6, wherein the multi-band compressor is configured to adjust the amplitude of the component of the test signal in steps of a predetermined amount.

8. A method, comprising:
dividing a frequency range into a plurality of frequency bands; and
automatically for each of the plurality of frequency bands:
receiving a distortion level, generating a test signal for the frequency band in response to the distortion level, the test signal including at least two simultaneous tones, the at least two simultaneous tones respectively being pure sine tones or frequency-modulated tones and having different concurrent frequencies within the frequency band, adjusting an amplitude of a component of the test signal, generating an audio signal with an audio transducer based on the test signal, receiving the audio signal with a distortion tuner, and determining the distortion level based on a detected amount of distortion in the audio signal.

9. The method according to claim 8, wherein the adjusting the amplitude of the component of the test signal is performed in steps of a predetermined amount.

10. The method according to claim 8, wherein respective ones of the at least two simultaneous tones are pure sine tones.

11. The method according to claim 8, wherein respective ones of the at least two simultaneous tones are frequency-modulated tones.

12. The method according to claim 8, wherein the determining the distortion level is based on a total harmonic distortion of the audio signal, a background noise, a system noise, an intermodulation distortion of the audio signal, or combinations thereof.

13. The method according to claim 8, wherein generating the distortion level is based on a perceptibility of the distortion.

14. The method according to claim 8, wherein the distortion level is based on a masking curve that represents an amplitude value as a function of a frequency.

15. The method according to claim 8, wherein the distortion level is based on an interpolation between two masking curves, wherein the masking curves respectively represent an amplitude value as a function of a frequency.

16. A non-transitory computer-readable medium storing instructions that, when executed by an electronic processor of a computer, cause the computer to perform operations comprising:

dividing a frequency range into a plurality of frequency bands; and automatically for each of the plurality of frequency bands:
receiving a distortion level, generating a test signal for the frequency band in response to the distortion level, the test signal including at least two simultaneous tones, the at least two simultaneous tones respectively being pure sine tones or frequency-modulated tones and having different concurrent frequencies within the frequency band, adjusting an amplitude of a component of the test signal, generating an audio signal with an audio transducer based on the test signal, receiving the audio signal with a distortion tuner, and determining the distortion level based on a detected amount of distortion in the audio signal.

17. The non-transitory computer-readable medium according to claim 16, wherein the adjusting the amplitude of the component of the test signal is performed in steps of a predetermined amount.

18. The non-transitory computer-readable medium according to claim 16, wherein the determining the distortion level is based on a total harmonic distortion of the audio signal, a background noise, a system noise, an intermodulation distortion of the audio signal, or combinations thereof.

19. The non-transitory computer-readable medium according to claim 16, wherein generating the distortion level is based on a perceptibility of the distortion.

20. The non-transitory computer-readable medium according to claim 16, wherein respective ones of the at least two simultaneous tones are pure sine tones.

* * * * *